United States Patent
Nosker et al.

[11] 3,968,326
[45] July 6, 1976

[54] TRAPEZOIDAL SMOOTH GROOVES FOR VIDEO DISC

[75] Inventors: Richard William Nosker, Princeton; Leonard Pincus Fox, Cherry Hill, both of N.J.

[73] Assignee: RCA Corporation, New York, N.Y.

[22] Filed: Sept. 6, 1974

[21] Appl. No.: 503,680

Related U.S. Application Data

[62] Division of Ser. No. 331,235, Feb. 9, 1973, Pat. No. 3,882,214.

[52] U.S. Cl. ............... 178/66 R; 179/100.4 R; 274/42 R
[51] Int. Cl.² ............... H04N 5/76; G11B 11/12
[58] Field of Search ............ 178/6.6 A, 6.6 R; 179/100.3 V, 100.4 R; 274/42 R, 41 R, 41 A; 264/106, 107

[56] References Cited
UNITED STATES PATENTS

| | | | |
|---|---|---|---|
| 3,235,672 | 2/1966 | Beguin | 179/100.3 V |
| 3,654,401 | 4/1972 | Dickopp | 179/100.3 V |
| 3,842,217 | 10/1974 | Clemens | 178/6.6 A |

*Primary Examiner*—Alfred H. Eddleman
*Assistant Examiner*—Alan Faber
*Attorney, Agent, or Firm*—Eugene M. Whitacre; William H. Meagher

[57] ABSTRACT

A method of forming a disc having an information recording groove of regular cross-sectional shape by forming a preliminary spiral groove of trapezoidal cross-section in a disc having a relatively flat surface, and then flowing an excess of viscous material on the groove surface of the disc while rotating the disc rapidly and long enough to flow off the excess viscous material so as to leave a continuous coating of viscous material over the surface of the disc, the trapezoidal regions being covered by a coating having a relatively constant radius of curvature.

3 Claims, 5 Drawing Figures

TRAPEZOIDAL SMOOTH GROOVES FOR VIDEO DISC

This is a division of application Ser. No. 331,235, filed Feb. 9, 1973, now U.S. Pat. No. 3,882,214.

BACKGROUND OF THE INVENTION

This invention relates to the manufacture of a disc suitable for recording of information such as video information. More particularly, this invention relates to a method of producing a groove in the surface of a disc prior to recording video information therein.

A typical system for recording and playing back of video information has been described by Jon K. Clemens in copending application Ser. No. 126,772 filed Mar. 22, 1971, now U.S. Pat. No. 3,842,194, which is assigned to the same assignee as the present invention. According to this system, an aluminum disc is first coated with a lacquer and a spiral groove is cut therein. The grooved lacquer surface is thereafter replicated by producing negative and then positive reproductions thereof by a series of nickel deposition steps. A photoresist coating is then applied to the positive replicated nickel. Video information is then recorded by selectively exposing the photoresist in the spiral groove to a video-signal-modulated electron beam produced by a scanning electron microscope. After exposure and development of the photoresist, the video information appears on the bottom and wall regions of the spiral groove in the form of geometric or topographical variations. This disc is then replicated by metal plating and the plated replica thereafter is used to stamp or emboss vinyl discs by methods known in the audio recording art. The vinyl replica is then metalized to form a conducting surface, which, in turn, is coated with a dielectric material. In playing back the recorded information, a stylus is caused to ride in the dielectric coated groove. This stylus, along with the metalization and dielectric, acts as a capacitor. Capacitance variations in the groove, which correspond to the recorded video information, are then detected electronically to recover the video information.

Groove pitch in such a video disc generally is between 2000 and 8000 groove convolutions per inch. As the number of groove convolutions per inch on a disc is increased, the cross-sectional dimensions available for recording in the groove decrease. That is, the amount of usable wall and valley region available in the cut groove for recording video information decreases. A decrease in the distance measured along the curved surface of the groove from the top (peak) of one wall to the top (peak) of the other wall (hereinafter referred to as the "surface width" of the groove) results in a decrease in the detectable variation in capacitance which manifests in a decreased signal output during playback of the embossed disc. In order to maintain a high signal-to-noise ratio in the playback of a replicated or embossed disc, it is desirable that the maximum usable surface width of the groove be utilized for recording video information and that such surface width also be contacted by the stylus in playing back the information. The greater the surface contact of the stylus with the video disc, the greater will be the detectable capacitance and its variations and the greater the signal-to-noise ratio.

In prior systems, the surface of the photoresist-coated groove prior to exposure to the scanning electron microscope has a substantially sinusoidal cross-sectional shape. This shape results from the close spacing of adjacent V-shaped groove portions or convolutions and the method of depositing photoresist thereon previously used. Such a sinusoidal shape has inflection points at or near its median amplitude, providing thereby a concave-shaped curve below the median level and a convexshaped curve above the median level. This curvature, upon which the video-information-carrying variations are impressed, should be taken into account in the shaping of a playback stylus. That is, if the groove shape is substantially sinusoidal in cross-section, a stylus placed in that groove preferably would have a complementary sinusoidal shape to make contact with a maximum wall and valley region of the groove. Typically the stylus tip is more nearly of a constant radius of curvature (i.e., a portion of a circle). To achieve this sinusoidal stylus shape in the stylus requires an additional manufacturing step of lapping the stylus tip to conform with the sinusoidal groove shape.

A further disadvantage of having a stylus tip that is not of substantially constant radius of curvature occurs if the groove in the disc is eccentric or if the video pickup arm housing the stylus is not perfectly centered over the groove. Under such conditions the stylus does not maintain perpendicularly with the groove and the contacted area between stylus and groove changes for small deviations in angle between stylus and disc surface. This change in contacted area undesirably results in a change in signal-to-noise ratio.

It is advantageous to shape the surface of the groove in the disc such that the stylus can more easily be made to conform with it and therefore utilize wall and valley regions of the groove for recording of information.

SUMMARY OF THE INVENTION

A method of forming a suitable disc for recording information therein comprises a first step of forming a spiral groove to a trapezoidal cross-sectional shape in a relatively flat disc. The spiral groove of the disc is then filled with a viscous fluid material and the disc is rotated at a speed commensurate with the viscosity of the fluid material. The purpose of rotating the disc is to form a uniform coating of viscous fluid material over the disc's surface and cause the portion of viscous fluid material remaining in the groove to assume a regular cross-sectional shape. This regular cross-sectional shape is one having points of inflection located closer to the peaks of the groove than to the valley of the groove and preferably is of a relatively constant radius of curvature in the valley portion between the points of inflection.

A better understanding of the invention may be obtained by referring to the detailed specification and the accompanying drawings, of which:

DETAILED DESCRIPTION

An initial disc suitable for recording video information may be formed by a number of methods similar to those employed in the audio record reproduction art. In prior video record reproduction methods as well as that described herein, the following preliminary steps may be followed in producing an initial disc. A base disc of ½ inch thick aluminum 14 inches in diameter is machined flat and a protective coating is applied to the aluminum surface to prevent chemical attack of the aluminum base prior to depositing a layer of bright copper or lacquer thereon. A uniform layer approximately 0.005 inch thick of such material is deposited on the disc surface. This layer is thereafter machined flat to within 0.0002 inches utilizing a diamond cutting tool. The surface is then further machined to improve the smoothness and a spiral groove is cut therein utilizing an appropriately shaped diamond cutting stylus. The depth of the cut typically is about 0.0001 inches and the spiral groove pitch is generally from about 2000 to 8000 groove convolutions per inch.

Figure 1:
FIG. 1 illustrates a cross-sectional representation of a disc having a V-shaped groove known in the prior art.

In prior art systems for producing an information storing disc, a V-shaped groove is cut in the manner described above into a copper or lacquered surface as shown in FIG. 1. This groove has a typical included angle of 90° and is formed so as to cause adjacent convolutions of the spiral groove to abut one another. Successive negative and positive replications of the grooved, lacquer or copper surface are thereafter made by nickel deposition and separation steps known in the audio recording art. The positive replica is coated with a layer of viscous material such as photoresist, electron beam sensitive material or other suitable material by spinning the disc at a velocity between 100 and 2000 rpm (typically 450 rpm for a material having a viscosity of 4.5 cps). Disc spinning velocity is selected in proportion to material viscosity. Rotation is then continued (e.g., for 1 minute) so as to remove excess material. The rotational speed is then decreased to about 5 rpm until the coating has dried. Other techniques for drying the viscous material may also be employed. For example, it has been found that for discs having a groove pitch of about 4000 groove convolutions per inch, a satisfactory viscous material coating may be obtained by maintaining the same rotational velocity utilized for applying viscous material until the viscous material has dried.

Figure 2:
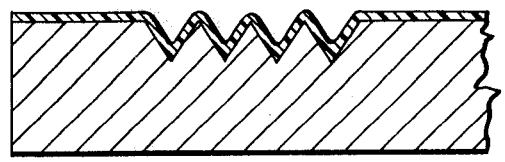
FIG. 2 illustrates a cross-sectional representation of a portion of a disc having a V-shaped groove in which a viscous material layer has been deposited by techniques known in the prior art.

FIG. 2 illustrates the substantially sinusoidal cross-sectional shape of the resulting prior art viscous material surface in the spiral V-shaped groove.

Figure 3:
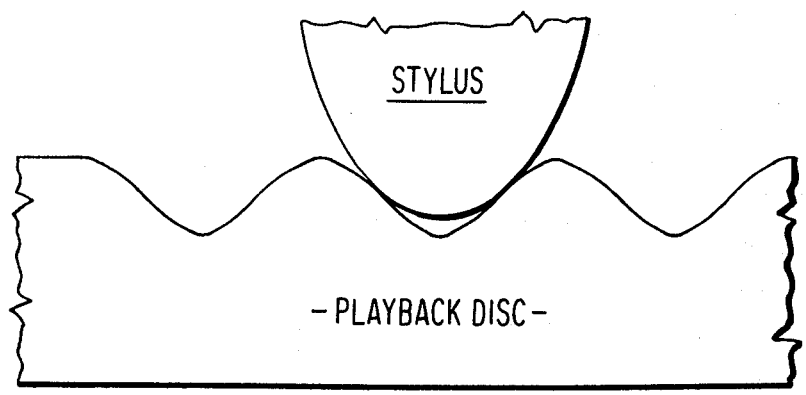
FIG. 3 illustrates the fit of a typical playback stylus into a replication of the groove shape illustrated in FIG. 2 as known in the prior art.

FIG. 3 illustrates the fit of a typical video playback stylus to a groove of substantially sinusoidal cross-sectional shape. The portion of the playback stylus that rides in the groove typically has a cross-sectional shape approximating a circular arc and provides a relatively poor fit in the sinusoidal-shaped groove, physically contacting the groove typically at two points.

Figure 4:
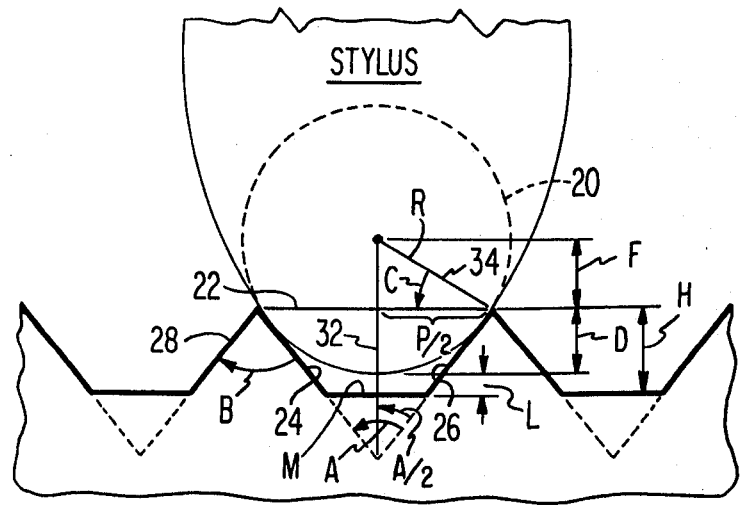
FIG. 4 illustrates a portion of a stylus and a trapezoidal groove cross-section useful in determining dimensions of a groove in a record constructed in accordance with the present invention.

FIG. 4 illustrates a method utilized, in accordance with the present invention, for deriving the dimensions of a trapezoidally-shaped groove which, upon appropriate application of a formable material such as a photo-resist, will closely fit a stylus tip of circular arc cross-section. Where the radius of the stylus tip is known, and the number of grooves per inch is known, the geometry of the groove is determined as follows. A circle 20 of radius approximately equal to that of the stylus is first drawn as illustrated in FIG. 4. A horizontal line 22 approximately equal to the reciprocal of the pitch of the spiral groove is then drawn across the circle. Tangents 24 and 26 are drawn to the circle at the points where line 22 intersects the circle. An angle A is formed at the intersection of line 24 and 26 of the triangle. Angle A may be determined by known trigonometric techniques. For example, an angle bisector 32 (see FIG. 4) may be drawn from the center of circle 20 through angle A forming thereby two similar triangles, one formed by lines 26, 32 and 34 and the other formed by lines 22, 32 and 34. By virtue of the similar geometry of these two right triangles, angle C is equal to angle A/2. Angle C may be calculated as the angle whose cosine is approximately one-half the pitch of the spiral groove divided by the radius 34 of circle 20. The angle A, as noted above, is twice the angle C.

In FIG. 4, the line 26 is substantially parallel to line 28 of the adjacent convolution of the groove. By virtue of this geometry, angle A formed by lines 24 and 26 is equal to the angle B formed by lines 28 and 24 and therefore angle B may be determined by calculating angle A.

Knowing the reciprocal of groove pitch 22 and having determined angle B, it is only necessary to determine the groove depth H in order to be able to form these trapezoidal-shaped grooves. Groove depth H is derived by first determining the circular groove depth D and then adding to that the additional thickness L of viscous material that will be deposited therein in a manner to be described below in connection with FIG. 5. Groove depth D is determined by known geometric methods. For example, length F may be determined by utilizing the pythagorean theorem: $F = \sqrt{R^2 - (P/2)^2}$; where R is equal to the radius of the circle 20 and P/2 is equal to one-half of length 22. Once F has been determined, D can be calculated by subtracting F from the radius R. The additional depth L necessary to form the groove is approximated by the following experimental procedure.

A spiral groove of V-shaped cross-section and pitch equal to that of the desired trapezoidal-shaped groove is formed on a disc of material such as copper. Viscous material of the same viscosity as that to be applied to the final disc is thereafter applied to the grooved disc by the process described earlier. After the viscous material has dried, the disc is cut along its diameter and the thickness of the material coating at the bottom of the copper groove measured. The measured material thickness in the V-shaped groove is approximately equal to the material thickness that will form at the bottom of a trapezoidal groove of the same pitch. This measured thickness of the material coating in the center of the V-shaped groove, therefore, is approximately equal to the depth L.

A practical example of the above-described method is hereinafter described for a video disc having a groove pitch of 4000 groove convolutions per inch and a stylus tip of 5 micron radius. In that case, the distance P (FIG. 4, line 22) is equal to 6.35 microns.

Angle A may now be determined as twice angle C. Length P/2 or one-half the length of line 22 is equal to about 3.18 microns. Angle C is computed as the arccosine of the 3.18 micron length P/2 divided by the 5 micron radius 34. This computation determines angle C to be about 50.5°. Hence, angle A is 101°, twice angle C.

The depth D of the desired final groove cross-sectional shape may be determined by calculating length F and subtracting it from the length of the radius of circle 20. As mentioned previously, F is equal to $\sqrt{R^2 - (P/2)^2}$. By substituting 5 microns for R and 3.18 microns for P/2, F may be calculated to be approximately 3.85 microns. The depth D is then equal to 5 microns minus 3.85 microns or 1.15 microns. With depth D known, it is only necessary to determine the viscous material thickness L for complete determination of how deep to cut the spiral groove.

Determination of the thickness L is one made experimentally as before mentioned with respect to FIG. 3 and varies as a function of the viscosity, solids content and volatility of the material coating, and groove pitch. Experimentation has shown that for a coating material having 5 percent solids content, 1.6 cps viscosity, and cellosolve acetate solvent, and for a disc having 4000 groove convolutions per inch, the residue at the bottom of the trapezoidal groove after spin processing and drying by, for example, the method described above is approximately 0.4 microns.

The total depth of the cut trapezoidal groove is the total of depth D and thickness L or 1.55 microns. With the angle B known as 101°, the width between groove peaks as 6.35 microns and the total groove depth known as 1.55 microns, the desired trapezoidal groove may be formed. One method that may be used to form the trapezoidal groove is to shape a diamond, or other suitable cutting stylus, to the complementary shape of the desired trapezoidal groove. A substantially smooth, uniform groove may then be obtained by repetitiously cutting the spiral groove in several passes of the groove cutting stylus.

Figure 5:
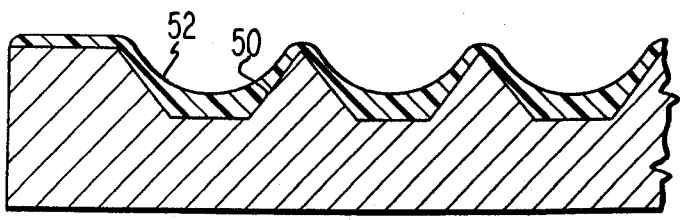
FIG. 5 illustrates a cross-sectional portion of a disc in which a spiral groove has been formed and upon which a viscous material has been deposited in accordance with the present invention.

FIG. 5 illustrates a cross-sectional view of a trapezoidally cut groove 50 on top of which a coating of material 52 has been formed. This material coating is illustrated as having exaggerated coating thickness about the wall and peak regions of the trapezoidal groove to emphasize the fact that the groove coating is continuous. Practical experience has demonstrated that by proper application of the material coating, material thickness about the groove-peak regions may be reduced to a trace, while still providing a groove coating 52 of desired shape. This resultant coating 52 has points of inflection located closer to the peaks of the groove than to the groove valley. By having these inflection points closer to the peaks, the remaining groove portion below the peaks will more closely resemble a circular arc. This circular arc groove shape, when replicated on the playback disc, provides the desired complementary fit with a readily formed playback stylus.

Material coating 52 may be formed over the trapezoidal-shaped grooves by the process described earlier, the fluid viscous material of about 4.5 cps viscosity being sprayed on the disc and the excess viscous material allowed to be thrown off by centrifugal force. Drying may be accomplished by slowing disc rotation to a velocity of about 2 to 10 rpm for a period of time until the viscous material is dry to the touch, (about 10 minutes). The material coating over the grooved region of the disc will then have a substantially constant radius of curvature over a major portion of the surface width between adjacent groove peaks.

In practice, it has been found that for a disc having a groove pitch of about 4000 grooves per inch, drying of the viscous material may be accomplished by continuing disc rotation at the same speed as utilized in its application. Other methods of material coating application and drying may also be used. A detailed description of a process for application of a viscous material such as photoresist may be found in copending U.S. patent application in the names of Robert Michael Mehalso and David Isaac Harris, Ser. No. 245,657, now U.S. Pat. No. 3,795,534.

An alternate method of producing a disc having a spiral groove with substantially constant radius of curvature may be accomplished by first forming a spiral groove having a triangular cross-sectional shape on a disc substrate such that flat regions or lands exist between adjacent convolutions of the groove. The resultant grooved disc is a negative model of the disc heretofore described with respect to FIG. 4 and its groove dimensions and spacing may be determined with respect to this figure. For example, the base angle of the triangular groove to be cut in the disc substrate corresponds to angle B shown in FIG. 4 and may be determined by the technique described herein with respect to FIG. 4. Similarly, the flat region between adjacent convolutions corresponds to length M of FIG. 4 and may be calculated from the numbers already determined with respect to this figure, by known geometric techniques such as similar triangles.

After the triangular grooves have been formed in the disc substrate, a nickel replica is made of it. This nickel replica may be formed by replication techniques known in the audio recording art. A typical replication technique evaporates or deposits nickel material on the substrate and subsequently peels the nickel coating away from the grooved substrate, to form a negative replication of the grooved substrate in the nickel.

The negative replica of the grooved substrate has trapezoidal-shaped grooves instead of triangular-shaped grooves and may, after mounting on a flat substrate disc for mechanical strength, be coated with viscous material by the process described with respect to FIG. 5 to form the smooth grooves of substantially constant radius.

A particular advantage of the alternate method is that irregularities formed at the upper edges of the original grooved substrate by the groove cutting process may be eliminated in the subsequent steps. When the original grooved substrate is replicated in nickel, the irregularities that appear at the upper edges of the grooved substrate appear at the lower inside edges or valleys of the negative replica. These irregularities are subsequently covered over by the application of viscous material. Consequently, the metal stamper replicated from this negative grooved substrate is free of irregularities. A detailed description of a method for removing undesired irregularities from the edges of grooved substrates is the subject matter of a copending U.S. application in the name of Richard William Nosker, entitled "SMOOTH GROOVES FOR INFORMATION STORING DISCS", Ser. No. 327,804, filed Jan. 29, 1973, and assigned to RCA Corporation.

Viscous material utilized in forming the smooth contours in the trapezoidal groove may, in general, be an energy sensitive material such as one sensitive to light or electron beam energy. An energy sensitive material is utilized to facilitate recording of information in the groove regions by apparatus such as lasers or scanning electron microscopes. These types of recording apparatus may be replaced in some instances by apparatus designed to mechanically cut signal information in the spiral groove regions. When mechanical recording is utilized, the viscous fluid material applied to the trapezoidal groove need not be energy sensitive as long as it is suitable for mechanical recording.

What is claimed is:

1. A disc record suitable for recording information thereon comprising:
   a disc substrate having a spiral groove of trapezoidal cross-sectional shape formed therein; and
   a surface material coating said trapezoidal spiral groove, said coated spiral groove having a surface of regularly curved cross-sectional shape including inflection points on each wall of said coated groove located closer to the peaks than to the valley of said coated groove, the surface curvature in said valley between said inflection points substantially corresponding to an arc of a circle.

2. A disc record in accordance with claim 1, for use as a recording master in the derivation of replica discs amenable to playback by a stylus with a convexly curved tip having a surface curvature approximately an arc of a circle of a given radius, wherein:
   said substrate is formed of copper and said trapezoidal groove has a symmetrical cross-sectional shape with sides substantially tangential to a circle whose radius approximates said given radius; and
   said surface material is electron beam sensitive.

3. The apparatus according to claim 1 for use in a recording process subjecting regions of said coated groove to exposure to a controlled source of energy of a given form, wherein:
   said surface material is a material exhibiting sensitivity to energy of said given form.

* * * * *